(12) United States Patent
Quentin et al.

(10) Patent No.: US 7,082,319 B2
(45) Date of Patent: Jul. 25, 2006

(54) METHOD FOR MANAGEMENT OF A COMMUNICATIONS MODULE AND DEVICE COMPRISING SUCH A MODULE

(75) Inventors: Pierre Quentin, Enghein (FR); Emmanuel Clerc, Noisy le Grand (FR)

(73) Assignee: Sagem S.A., Paris (FR)

( * ) Notice: Subject to any disclaimer, the term of this patent is extended or adjusted under 35 U.S.C. 154(b) by 552 days.

(21) Appl. No.: 09/882,197

(22) Filed: Jun. 15, 2001

(65) Prior Publication Data

US 2002/0193098 A1 Dec. 19, 2002

(30) Foreign Application Priority Data

Jun. 15, 2000 (FR) .................................. 00 07662

(51) Int. Cl.
*H04B 1/38* (2006.01)

(52) U.S. Cl. ...................... 455/558; 455/418; 455/419; 455/420

(58) Field of Classification Search ................ 455/558, 455/418–420, 470, 411; 379/357.01
See application file for complete search history.

(56) References Cited

U.S. PATENT DOCUMENTS

| | | | | |
|---|---|---|---|---|
| 5,887,266 A | * | 3/1999 | Heinonen et al. ........... | 455/558 |
| 6,085,099 A | * | 7/2000 | Ritter et al. ................ | 455/466 |
| 6,141,564 A | * | 10/2000 | Bruner et al. ............... | 455/558 |
| 6,622,018 B1 | * | 9/2003 | Erekson ...................... | 455/420 |
| 6,671,522 B1 | * | 12/2003 | Beaudou ..................... | 455/558 |

FOREIGN PATENT DOCUMENTS

FR 199907 * 6/1997

OTHER PUBLICATIONS

"Digital cellular telecommunications system (Phase +2); Specification of the SIM Application Toolkit for the Subscriber Identity Module-Mobile Equipment (SIM-ME) interface." dated Jul. 1, 1997, pp. 1-56, Valbonne, France.

* cited by examiner

*Primary Examiner*—Edan Orgad
*Assistant Examiner*—Angelica M. Perez
(74) *Attorney, Agent, or Firm*—Boyle, Fredrickson, Newholm, Stein & Gratz, S.C.

(57) ABSTRACT

In a method for the management of a communications module on a telephony network, the module is connected to a terminal that is incapable by itself of getting connected to the telephone network. The module has a tool kit microcircuit whose management is shared between the module and the terminal so as to limit communications on a link between the module and the terminal. The module and the terminal exchange messages in the HAYES format in order to standardize an interface between the module and the terminal. The messages exchanged are command messages, responses to commands, or general information on the state of the device.

21 Claims, 2 Drawing Sheets

METHOD FOR MANAGEMENT OF A COMMUNICATIONS MODULE AND DEVICE COMPRISING SUCH A MODULE

BACKGROUND OF THE INVENTION

1. Field of the Invention

An object of the invention is a method for the management of a communications module and a device comprising such a module. The field of the invention is that of electronic communications and extension modules for devices such as electronic data management terminals. The term "terminal" is understood to mean a device such as an electronic organizer, electronic personal assistant or even personal computer. The aim of the invention is to increase the autonomy of such a terminal to which a communications module is connected. Another aim of the invention is to standardize a communications interface between a terminal and a communications module The term "communications module" is understood to mean a device comprising means to set up a connection with another remote device but without any man/machine interface. To illustrate this point, it can be said that a mobile telephone can serve as a communications module when it is used as a modem but that it is not a communications module as understood in the invention.

2. Description of the Prior Art

In the prior art, there is a known terminal that can be connected to a communications module, for example by a serial link. The communications module may then be a GSM module, the terminal being a personal computer. The GSM module then comprises the means needed to set up an RF link with a base station of a GSM network, as well as a microcircuit card, for example of the SIM or SIM toolkit type. A SIM card is defined by the ISO 7816 standards as well as by the GSM recommendations 1, 2, and 2+. The SIM card is mainly a set of files that can be accessed through standardized commands. A SIM card therefore comprises a set of commands and files that can be accessed according to authentication protocols that ensure the security of the data contained in the files of the SIM card. The difference between a simple SIM card and a SIM toolkit card is that the SIM toolkit card is said to be proactive. This means that it can initiate action on a GSM module or a terminal. A SIM toolkit card therefore does not only respond to outside action. It can also command actions to be performed.

In the prior art, a GSM module cannot work without a SIM card. Indeed, the SIM card contains all the information about a mobile telephony network subscriber. To get connected to a mobile telephony network, the GSM module needs this information. In the prior art, the GSM module and the SIM card are driven by the terminal to which the GSM module is connected. According to the standard, the SIM card receives responses to which it responds. For example, for consulting a file, the SIM card receives several SELECT type instructions to position a reading pointer on the right file. To each of these SELECT instructions, the SIM card sends a response and this response is itself followed by a GET RESPONSE instruction in order to obtain information on the file on which the reading pointer is positioned. In the prior art, all this information flows through the connection between the GSM module and the terminal. Furthermore, all the commands are sent by the terminal and all the responses of the SIM card are sent by the terminal. This leads to substantial congestion in the connection between the terminal and the module. This also leads to substantial activity for a microprocessor of the terminal linked to the management of the SIM card.

These problems are even more acute in the case of the SIM toolkit card. Indeed, the SIM card is then capable of producing commands that have to be executed either by the GSM module or by the terminal or by both. In the prior art, when the SIM toolkit card sends a command that has to be executed by the GSM module, this command is initially received and decoded by the terminal. The terminal receives this command through the connection that connects it to the GSM module. Then the terminal detects the fact that this command is not addressed to it and sends it back by the same connection to the GSM module so that it carries it out. If the execution of this command calls for a response, this response will be first of all sent to the terminal which will send it to the SIM toolkit card. In this specific instance, there is therefore a large quantity of data that flows on the connection between the terminal and the GSM module, and a substantial quantity of information processed by a microprocessor of the terminal.

Furthermore, in the prior art, a SIM toolkit card does not spontaneously send responses. In fact, the SIM toolkit card is subjected to a polling command at regular intervals. The SIM toolkit card responds to this command by a code which states whether or not it wishes to send a command. If it wishes to send a command, it reports this in its response to the polling command. It will then receive a FETCH command in response to which it will be able to send its proactive command. In the prior art, the polling and FETCH commands are sent by the terminal. These commands therefore flow on the connection between the terminal and the GSM module. All these commands are thus managed by the microprocessor of the terminal. The activity of the terminal and the congestion in the connection between the terminal and the GSM module is therefore great, partly because of the simple management of the SIM card or SIM toolkit card. This means that there is great activity in the microprocessor and therefore high energy consumption and, therefore, ultimately a reduction of the autonomy of the terminal.

In the invention, these problems are resolved by transferring the management of the standard SIM card into the GSM module and distributing the management of the SIM toolkit card between the GSM module and the terminal to which the module is connected. In particular, the messages sent by the SIM toolkit card are filtered in the GSM module so that only those truly of interest to the terminal are sent to it. Similarly, the polling of the SIM toolkit card is carried out by the GSM module. Thus, the quantity of information flowing in the connection between the GSM module and the terminal is limited. The activity of a microprocessor too is limited. Indeed, all that this microprocessor has to do thereafter is to process messages directly related to the terminal and its capacities, for example a man/machine interface.

An object of the invention therefore is a method for management of a communications module comprising means to fulfil a communications function, and a detachable microcircuit for a terminal comprising means, including a microprocessor, to set up a man/machine interface in which the microcircuit and the terminal communicate by sending messages through a module-terminal connection between the module and the terminal, wherein:

messages are sent from the microcircuit to the terminal, in the module, messages sent by the microcircuit are distributed between the module and the terminal to limit the communications on the module-terminal connection and to limit an activity, related to a processing of a message, of the microprocessor of the terminal.

SUMMARY OF THE INVENTION

An object of the invention is also a communications device comprising a terminal, comprising means to make a man/machine interface and an extension module for the terminal, the extension module comprising a microcircuit, wherein:
the terminal and the module comprise communications means to communicate with each other,
the module comprises means to filter messages sent by the microcircuit, the filtering means co-operating with the communications means.

BRIEF DESCRIPTION OF THE DRAWINGS

The invention will be understood more clearly from the following description and the appended figures. These figures are given purely by way of an indication and in no way restrict the scope of the invention. Of these figures.

MORE DETAILED DESCRIPTION

Figure 1:
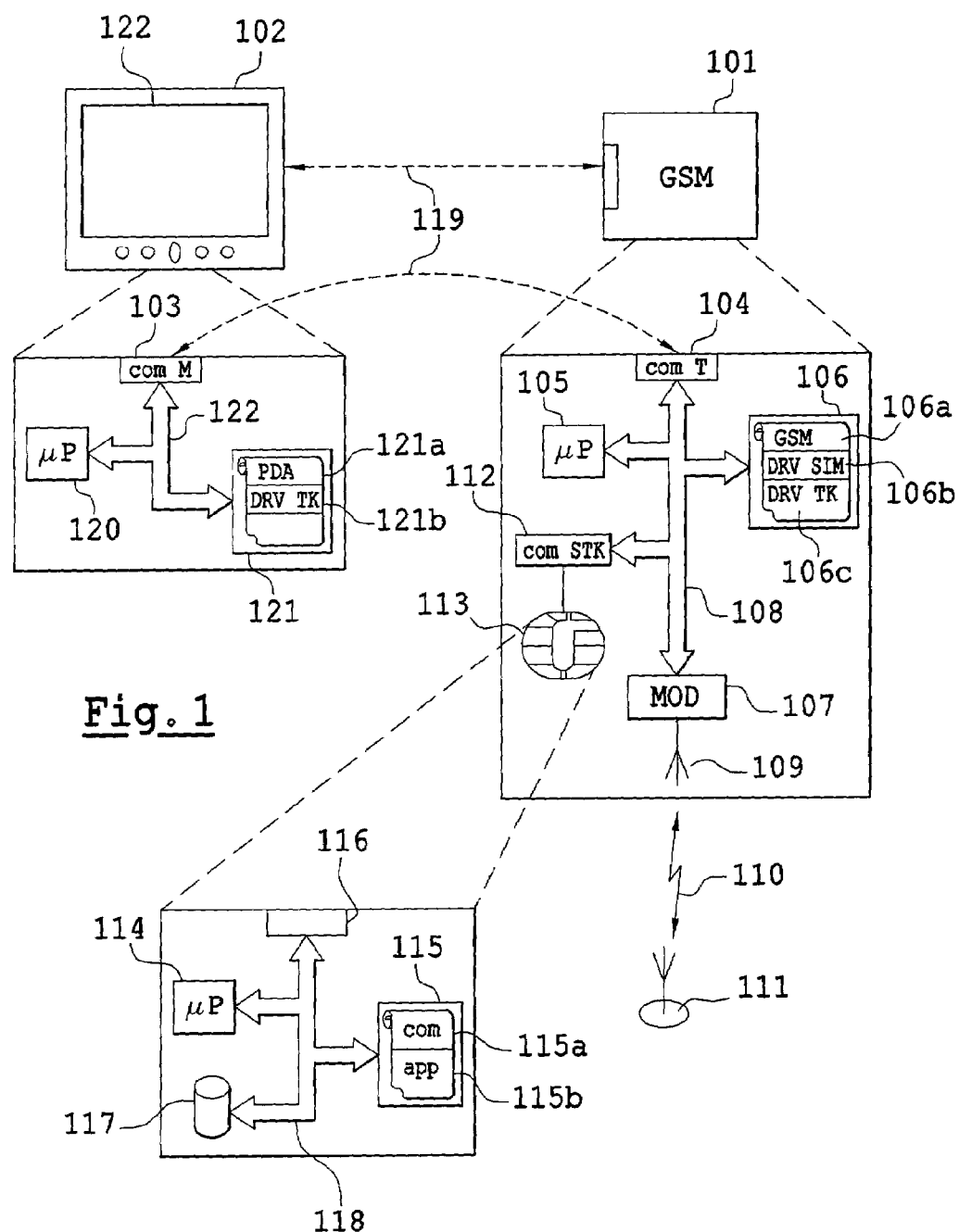
FIG. 1 illustrates means used for the implementation of the method according to the invention.

FIG. 1 shows a communications module 101. In the example of the description, the module 101 is a GSM module. In practice, the module 101 can also be a module using the UMTS, DCS or other standard. The module 101 is connected to a terminal 102. In the example of the description, the terminal 102 is chosen to be a personal digital assistant (PDA). The PDA 102 can perform diary, organizer and storage functions with or without various reminder and clock functions. By itself, the terminal 102 is incapable of communicating through a telephone network. The terminal 102 nevertheless has a port 103 to which it is possible to connect an extension module, for example a communications module such as the module 101. To this end, the module 101 has a port 104 corresponding to the port 103 of the PDA 102. In practice, the PDA 102 has a receptacle to receive the module 101. Within this receptacle, there is the port 103 into which a connector 104 of the module 101 gets plugged.

FIG. 1 shows that the module 101 has a microprocessor 105, a memory 106 and modulation and demodulation circuits 107. The elements 104 to 107 are connected to a bus 108. A bus is a set of wires or tracks containing elements sufficient in number to convey data, address, command, interruption and clock signals. In this description, when an action is assigned to a microprocessor, it is performed by this microprocessor controlled by instruction codes recorded in a memory.

The circuits 107 are connected to an antenna 109. This antenna 109 sets up an RF link 110 with a first base station 111 of a cell telephony network. In the present description, it is assumed that the telephone network, known as a cell telephony network, is of the GSM type. However, there is no reason why this network should not be, for example, a DCS network or a UMTS network or any other type of telecommunications network.

The memory 106 has several zones. A first zone 106a comprises instruction codes that control the microprocessor 105 when the microprocessor 105 has to perform a communications task. The elements 105, 106a, 108, 107, and 109 therefore constitute means to fulfill a communications function of the module 101. The memory 106 has a second zone 106b with instruction codes that command the microprocessor 105 when a SIM card of the module 101 has to be managed. A zone 106c comprises instruction codes that command the microprocessor 105 when a SIM toolkit card has to be managed. The zone 106 has other zones, especially working zones and data storage zones, that are not shown in FIG. 1.

FIG. 1 shows that the module 101 has circuits 112 for communications with the SIM toolkit card. In practice, the circuits 112 may be of the UART (Universal Asynchronous Receiver Transmitter) type used to set up a serial link with a SIM toolkit card 113. In one variant of the invention, it is possible that the module 101 may actually comprise two SIM type cards, one SIM card proper and one toolkit card. In this case, there are two circuits of the circuit 112 type so as to enable communications with the two SIM cards and the SIM toolkit card.

In practice, a SIM toolkit type card is not an integral part of the module 101. However, the module 101 has at least one receptacle for a SIM toolkit card. The module 101 does not work in general because there is no SIM card in this receptacle.

FIG. 1 shows that the SIM toolkit card 113 has a microprocessor 114, a program memory 115, communications circuits 116 and a storage memory 117. The elements 114 to 116 are connected by a bus 118. The memory 115 has a zone 115a by which the card 113 can communicate with the module 101 and especially with the microprocessor 105 through the circuits 116 and 112. Indeed, the circuits 116 can be used to set up communications between the module and the card 113 through the circuit 112. The memory 115 also has a zone 115b comprising instruction codes that command the microprocessor 114 when it executes an application proper to the SIM toolkit card. This application may be dedicated for example to the management of electronic mail, Internet navigation using the WAP standard or other services offered by the telecommunications network with which the user of the module 101 has a subscription. The WAP (Wireless Application Protocol) standard is the counterpart of the HTTP standard adapted to the man/machine interfaces (MMI) of portable instruments such as mobile telephones or PDAs.

The PDA 102 and the module 101 are connected to a link 119. In FIG. 1, this link was made between circuits 103 and 104. For example, the circuits 103 and 104 are the two elements of a PCMCIA type interface. However, in one variant of the invention, it is possible to envisage a case where the module 101 is not specifically connected to the terminal 102. In this case, the module 101, instead of the circuits 104, has for example a Bluetooth circuit. Then the PDA 102 too has a Bluetooth circuit instead of the circuit 103. Thus, between the PDA 102 and the module 101, it is possible to set up a Bluetooth type communication. It is thus possible to envisage any type of connection between the PDA 102 and the module 101 without detriment to the nature of the invention.

FIG. 1 shows that the PDA 102 has a microprocessor 120 and a memory 121. The elements 103, 120 and 121 are connected by a bus 122. The memory 121 has several zones. A first zone 121a has the instruction codes that command the microprocessor 120 when this microprocessor carries out instructions related to the performance of the PDA functions. These functions may, for example, be those of a diary or an organizer. The memory 121 has a second zone 121b that comprises instruction codes which command the microprocessor 120 when it processes messages coming from the card 113. The memory 121 has other zones, for example a working and data storage zone. These zones are not shown in FIG. 1.

In the zones 106b and 106c, the module 101 therefore has instruction codes that command the microprocessor 105 when it has to manage messages coming from the card 113 pertaining to a toolkit application. These instruction codes are used inter alia to distribute the messages sent by the card 113 between the module 101 and the PDA 102. When the microprocessor 105 detects a message intended for the PDA 102, especially a message pertaining to the man/machine interface, the microprocessor 105 sends this message through the circuits 104. The means for distributing the messages therefore work together with the means of communications between the module 101 and the PDA 102.

A message thus sent is received by the microprocessor 120 through the circuits 103. The microprocessor 120 is then controlled by the instruction codes of the zone 121b. The management means of the microcircuit included in the PDA 102 therefore cooperate with these communications means of the module 101. In the description, it is assumed that the man/machine interface is implemented by instruction codes contained in the zone 121a. Indeed, an ergonomical man/machine interface is one of the qualities of the devices of the PDA 102 type.

Figure 2:
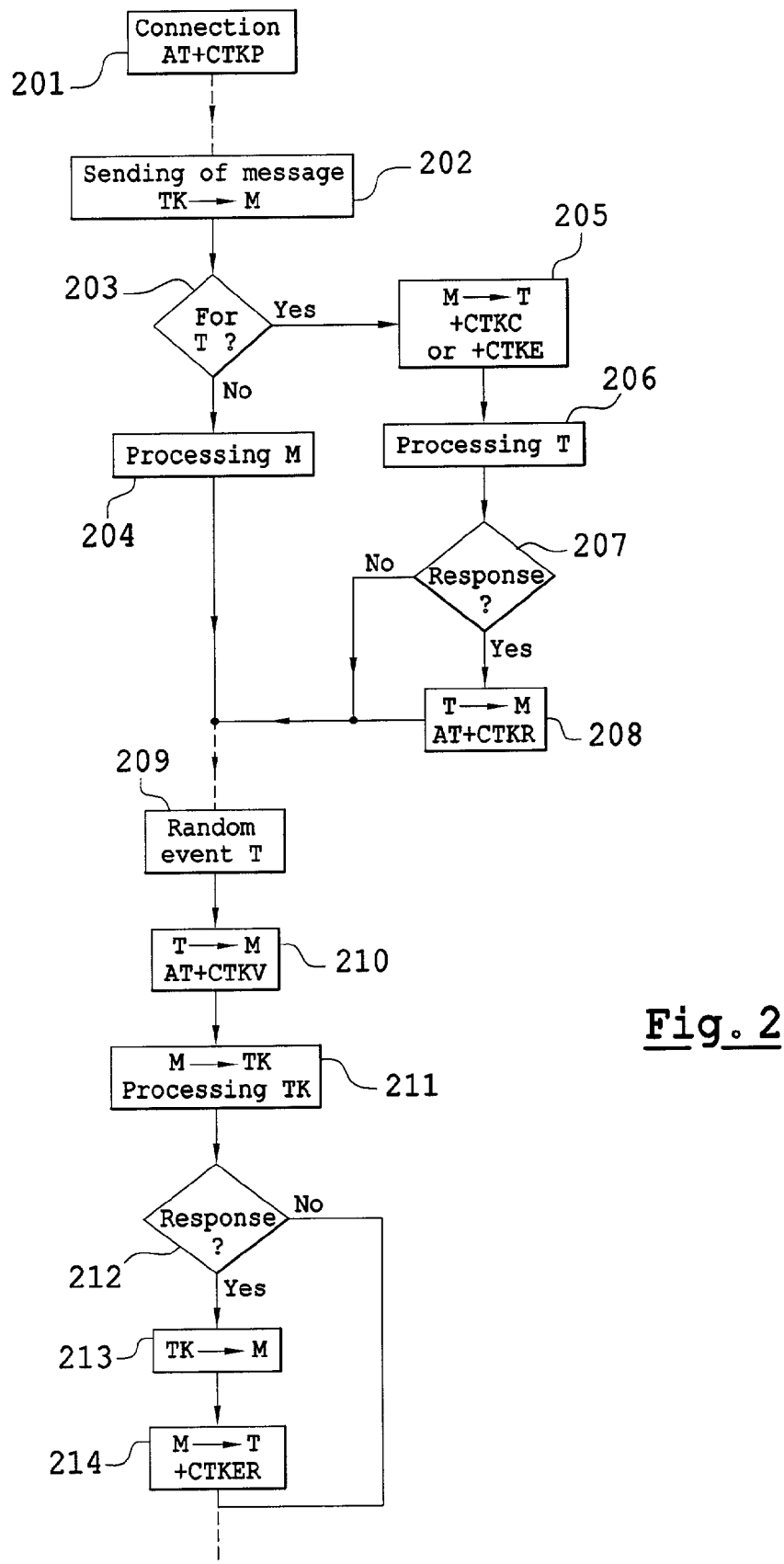
FIG. 2 illustrates steps of the method according to the invention.

FIG. 2 shows a preliminary step 201 of connection of the module 101 with the PDA 102. In the step 201, the microprocessor 120 has constituted a message and has sent it to the module 101. The messages are always sent through the connection 119. When the microprocessor 105 responds to or processes a message that it has received from the PDA 102 or the card 113, it is controlled by the instruction codes of the zones 106b or 106c depending on the origin and destination of the message. If the message relates to an application of the SIM card, it is the zone 106b, and if the message relates to the application of the toolkit card, it is the zone 106c. Similarly, when the microprocessor 120 processes or sends a message that it has received through the connection 119, if the message relates to a toolkit application, this message is processed by instruction codes of the zone 121b.

In the step 201, the microprocessor 120 forms a message to inform the module 101, and more particularly the card 113, of the possibilities of the PDA 102. More particularly, this message will be formatted according to a HAYES type standard. The HAYES format corresponds to messages constituted by a command code, often preceded by AT, and a list of parameters. The HAYES protocol is asymmetrical: there is a master and a slave. The master sends commands preceded by the AT and the slave sends responses to the commands or unsolicited responses. These responses are generally not preceded by an AT. The messages are constituted by displayable characters of the ASCII code. The format is widely used to communicate with modems through a serial link. This means that the message is sent as a series of bytes. The first bytes correspond to a command known as an AT command in the HAYES format. The bytes that follow the command correspond to parameters of this command. The command or message sent by the PDA 102 in the step 201 to the module 101 is therefore a command whose header is:

AT+CTKP list of parameters

This list of parameters consists of predetermined codes which indicate the functions related to a toolkit application that the microprocessor 120 can process. It may be, for example, a computerized money application, a WAP type application, a mail type application or any other application that can be achieved by means of a toolkit type card. Once this message is constituted, it is sent by the PDA 102 towards the module 101. The message is therefore received by the module 101 and processed by the microprocessor 105. The microprocessor 105 notes that it is a message intended for the card 113. Indeed, the header of the message comprises AT+, signifying that it is a HAYES command, and CTKP signifying therefore that it is a message intended for the toolkit card, with the P signifying that these are parametrizing information elements. The microprocessor 105 therefore sends this information to the card 113 through the circuits 112. In general, the link between the module 101 and the card 113 is a serial link. The format of the data flowing on this link is defined by the recommendation 11.4 of the GSM standard. When it receives this information, the microprocessor 114 stores it in a zone of the memory 117. In the case of the step 201, the message received from the PDA 102 will be translated in a first stage into instructions for positioning a reading pointer and then into commands for writing data blocks at the position at which the pointer is pointed. The written data elements then correspond to the possibilities in terms of PDA 102.

After the step 201, the operation goes to the step 202 for sending a message from the card 113 to the module 101. A sending of this kind can be done only after the card 113 is acted upon by the module 101, namely by the microprocessor 105. This action may be a command or a polling message as explained here above. When the microprocessor 105 has received the message sent by the circuits 113, there is a passage to a step 203 for determining the addressee of this message.

In the step 203, the microprocessor 105 determines the addressee of the message that it has just received. The criteria used to determine the addressee may be based, for example, on whether it is a message relating to the IHM or a message relating to the management of the GSM network to which the module 101 is connected. A message relating to the IHM may be either a request for information that must be entered by the user of the PDA 102 so that the toolkit application can carry out its processing, or a response by a toolkit application to an action to which the PDA 102 is subjected. A message in relation to the GSM network may be, for example, a message for setting up a connection on said network. A toolkit application is a set of instruction codes stored in the memory 115 and executed by the microprocessor 114.

If the message received by the microprocessor 105 is not for the PDA 102, the operation passes to a step 204 of processing the message by the module. Otherwise there is a passage to a step 205 of sending a message in the HAYES format of the module 101 towards the terminal 102.

In the step 204, it may be considered that the toolkit application has requested that a connection be set up on the network 111. This request may, for example, follow a call on the user through the PDA 102. This call on the user corresponds to a request for setting up a remote link to get connected to a WAP type network. The toolkit application, on receiving this call on the user, therefore knows that a link must be set up on the GSM network, but it also knows that the microprocessor 120 does not have to be informed of the details of the setting up of this connection. The setting up of this connection is therefore managed integrally and in a known way by the module 101. The only piece of information pertaining to the setting up of this link which is traced back to the PDA 102 is the failure or success of the attempt to set up the link.

In the step 205, the microprocessor 105 formats a HAYES type message and sends this message to the PDA 102. The message is formatted as a function of the message received by the microprocessor 105 in the step 202. This message could be either:

+CTKC command, parameters if it is a command that the microprocessor 114 requests the microprocessor 120 to perform, or a command:

+CTKE command, parameters if the PDA 100 has to be informed of the result of the processing of a prior command, for example the success of the setting up of a connection.

A command +CTKC or +CTKE is followed by a list of parameters. In the case of a command +CTKC, this list comprises at least the command to be performed as well as useful parameters to perform this command. This command may for example be a request for the entry of information by the user of the PDA 102. For example, the microprocessor 114 needs a password to be able to get connected to a WAP site. Once the HAYES type message is constituted, it is sent to the microprocessor 120. This is the step 206 for processing this message by the microprocessor 120.

In the step 206, the microprocessor 120 decodes the message. If the user has to be asked for example to enter a password, the microprocessor 120 prompts the display on a screen 122 of the PDA 102 of a message requesting the user of the PDA 102 to enter a password. The user enters this password and then validates it. Instead of the password, the information to be entered may be any other piece of information such as a response to a question for example or the making of a choice between two possible branchings on a WAP site.

From the step 206, there is a passage to a step 207 in which it is determined whether the processing of the message received calls for a response or not. If a response is called for, then the operation passes to a step 208 for sending a message from the PDA 102 to the module 101. If not, there is a passage to a step 209. From the step 204, there is also a passage to a step 209.

In the step 208, the microprocessor 120 constitutes a message of the following type in the HAYES format:

AT+CTKR parameter

The parameter is a response to the processing of the previous message +CTKC. The response is for example the password entered by the user. Once the message is constituted it is sent to the microprocessor 105 which converts it before sending it to the card 113.

In the step 209, a random event occurs and this event is detected by the PDA 102. The step 209 may occur any time and not specifically after a step such as 204 or 208. This event is for example a selection, on the PDA 102, of an option of connection to a WAP site by the user of the PDA 102. The operation passes to the step 210 for forming a message which will be sent from the PDA 102 to the module 101. This message will have a HAYES type format:

AT+CTKV parameters followed by parameters indicating the nature of the event. From the step 210 there is a passage to a step 211 in which the module 101, namely the microprocessor 105 translates the message that it has just received from the PDA 102 and sends it for processing to the circuit 113. The microprocessor 114 then carries out the processing operation corresponding to the message that it has just received. If it is a request for connection to a WAP site, the microprocessor 114 then initiates the connection on the GSM network so that it can get connected to this WAP site. There is a passage to a step 212 of ascertaining that the message received by the microprocessor 114 in the step 211 requires or does not require a response.

If the message requires a response, there is a passage to a step 213 for setting up a message by the microprocessor 114. This message will be sent to the microprocessor 105. There is then a passage to a step 214 in which the microprocessor 105 formats the message that it has just received at the step 213 into a message in the HAYES format +CTKER parameters followed by parameters corresponding to the response to the message received by the microprocessor 114 in the step 211.

In general, the AT+CTKV type messages are known as envelope messages. In the standard, this means that they are off-context messages. In other words, it means that the message received by the microprocessor 114 in principle has nothing to do with the activity that it is performing. The message +CTKER corresponds to a response to an envelope message.

As a rule, if the microprocessor 105 receives a command from the microprocessor 114 that has to be processed partly or totally by the PDA 102, the microprocessor 105 filters the elements of the control message that it must send to the PDA 102. This dispatch will be done in a message of the +CTKC type followed by parameters useful for the PDA 102.

If the command requires a response from the PDA 102, the response will be sent in the form of a message AT+CTKR followed by the type of command and response that will be made to this command.

If the processing of a command is distributed between the microprocessor 120 and the microprocessor 105, the microprocessor 105 will send the PDA 102 a +CTKE type message followed by parameters to indicate that it has finished processing the part that it is responsible for.

There is another type of command sent from the module 101 to the PDA 102. This is an AT+CTKF type command followed by a type of command and parameters. This command informs the PDA 102 that the microprocessor 114 was unable to perform an action that was requested of it.

What is claimed is:

1. A method for management of a communications module comprising means to fulfil a communications function, and a detachable microcircuit for a terminal comprising man-machine interface means, that includes a microprocessor, in which the microcircuit and the terminal communicate by sending messages through a module-terminal connection between the module and the terminal, wherein:

messages are sent from the microcircuit to the terminal, in the module, messages sent by the microcircuit are distributed between the module and the terminal to limit the communications on the module-terminal connection and to limit an activity, related to a processing of a message, of the microprocessor of the terminal.

2. A method according to claim 1, wherein: 3 a message of the microcircuit is processed in the terminal, the results of the processing are notified to the microcircuit.

3. A method according to claim 1, wherein the messages sent by the microcircuit are filtered by the module for the transmission, to the terminal, of those messages related to a management of the man/machine interface, the other messages being processed by the means of the module.

4. A method according to claim 1, wherein the messages sent out by the microcircuit are filtered by the module to transmit those messages that correspond to a response of the microcircuit following a request sent by the terminal, the other messages being processed by means of the module.

5. A method according to claim 1, wherein the messages exchanged between the microcircuit and the terminal are formatted according to a Hayes type format by formatting means of the module.

6. A method according to claim 1, wherein a message sent by the microcircuit or the terminal respectively to the terminal or the microcircuit respectively is included in the following list:
+CTKC list of parameters
AT+CTKR list of parameters
+CTKE list of parameters
AT+CTKV list of parameters
CTKER list of parameters
AT+CTKP list of parameters
AT+CTKF list of parameters.

7. A communications device comprising a terminal, comprising means to make a man/machine interface and an extension module for the terminal, the extension module comprising a detachable microcircuit, wherein:
the terminal and the module comprise communication means to communicate with each other,
the module comprises means to filter messages sent by the microcircuit, the filtering means co-operating with the communication means to limit the communications on a module-terminal connection and to limit an activity related to a processing of a message of a microprocessor of the terminal.

8. A device according to claim 7, wherein the terminal comprises means for the management of the microcircuit cooperating with the communication means.

9. A communications device for a terminal having a processor, comprising:
(a) a commnunications module including a processor, a memory, an antenna for wirelessly communicating with a telecommunications network, and a link that connects the module to the terminal;
(b) a detachable microcircuit detachably connected to the module and configured to enable the terminal to communicate with the telecommunications network via the communications module; and
wherein the communications module processor is configured to filter messages sent from the microcircuit to distribute the messages between the module and the terminal to limit module-terminal communications on the link and to limit terminal processor message processing related activity.

10. A communications device according to claim 9, wherein the terminal comprises a personal digital assistant, the communications module is connected by a PCMCIA link to the terminal, and the detachable microcircuit comprises a SIM.

11. A communications device according to claim 10, wherein the SIM comprises a SIM toolkit card.

12. A communications device according to claim 9, wherein the terminal comprises a personal digital assistant, the link is a wireless link that connects the communications module to the terminal, and the detachable microcircuit comprises a SIM.

13. A communications device according to claim 12, wherein the wireless link comprises a Bluetooth link.

14. A communications device according to claim 13, wherein the SIM comprises a SIM toolkit card.

15. A communications system comprising:
(a) a terminal equipped with a processor arid memory;
(b) a communications module including a processor, a memory, an antenna for wirelessly communicating with a telecommunications network, and a link that connects the module to the terminal;
(c) a detachable microcircuit detachably connected to the communications module that is configured to enable the terminal to communicate with the telecommunications network through the communications module to manage e-mail, access the Internet, or access a subscription service via the telecommunications network;
(d) means for communication between the terminal and the module via the link; and
(e) means for filtering messages sent by the microcircuit cooperating with the communication means to distribute the messages between the terminal and the module so as to limit message communications on the link and to limit message processing activity of the terminal processor.

16. A communications system according to claim 15, wherein the memory of the terminal holds a detachable microcircuit instruction set, and the memory of the communications module holds detachable microcircuit instruction codes.

17. A communications system according to claim 16, wherein the detachable microcircuit comprises a processor and memory that holds processor instruction codes.

18. A communications system according to claim 17, wherein the detachable microcircuit comprises a SIM.

19. A communications system according to claim 17, wherein the SIM comprises a SIM toolkit card and the terminal comprises a personal digital assistant.

20. A communications system comprising:
(a) a personal digital assistant equipped with a processor and memory that holds SIM message instructions;
(b) a communications module including a processor, a memory that holds communication task instructions and SIM card instructions, a modem and an antenna connected to the modem for wirelessly communicating with a cellular telecommunications network, and a link that connects the module to the personal digital assistant;
(c) a SIM connected to the communications module that is configured to enable the personal digital assistant to communicate with the cellular telecommunications network to manage e-mail, navigate the Internet, or access a subscription service via the telecommunications network; and
wherein messages are sent by the SIM to the personal digital assistant, with messages sent by the SIM being distributed in the module between the module and the personal digital assistant in a manner limiting communications on the link and limiting processing activity of the personal digtial assistant processor that is related to message processing.

21. A communications system according to claim 20, wherein the SIM comprises a SIM toolkit card that has an onboard processor, and onboard memory storage that holds communication instructions and processor instructions.

* * * * *